Patented Oct. 24, 1950

2,527,499

UNITED STATES PATENT OFFICE 2,527,499

PINEAPPLE PLANT CULTURE

Ferdinand P. Mehrlich, Honolulu, Territory of Hawaii, assignor to Hawaiian Pineapple Company, Limited, Honolulu, Territory of Hawaii, a corporation of Hawaii No Drawing. Application December 11, 1944, Serial No. 567,781

8 Claims. (Cl. 71—2.5)

This invention relates to the culture of pineapple and like plants and to methods for chemically controlling the growth thereof.

More particularly, the invention concerns the application to such plants of those synthetic organic compounds known as "plant hormones" which, under certain conditions of application, have a general growth stimulating effect on plants.

This application is a continuation-in-part of my co-pending application Ser. No. 485,181, filed April 30, 1943, now Patent No. 2,428,335, issued September 30, 1947.

It is an object of the present invention to provide novel methods of plant culture in which, by the utilization of plant hormones, the size and weight of the fruits are substantially increased, the quality is improved and/or the date of maturation of the fruit may be changed as desired.

Another object is the provision of methods of plant culture by which these advantageous results are obtained without deleterious effect upon the quality and the sugar content of the fruit.

In conventional pineapple culture, difficulty may be experienced by the weakening of the peduncle (fruit stem) allowing the fruit to fall over, exposing large areas of the fruit to the direct rays of the sun. This results in considerable damage to the fruit and loss from sun-scald or sunburn of the fruit.

A further object of the invention is to provide a novel method for pineapple culture in which, through the use of synthetic hormones, the fruit stem is strengthened, the fruit is kept erect, sunscald is reduced, and the size and weight of the fruit is increased.

Another object of the invention is to effect a mechanical strengthening of the outer tissues of the fruit which are commonly referred to as the shell of the fruit. It is desirable to strengthen these tissues as a means of limiting bruising of the fruit in the harvesting operations and in the transportation and other handling of the fruit.

I have discovered that the beneficial results which it is the object of this invention to produce can be obtained by application of synthetic hormones directly to the growing plants and to the fruit thereof at proper times and in proper concentrations and quantities as will be hereinafter fully explained. By means of this discovery, I am enabled to bring about an increase in the weight of the pineapple fruit by as much as a pound or more per fruit while also correspondingly increasing its size and improving its quality. This amounts to an increase of eight tons or more fruit per acre. I also accomplish a delay in the maturation of the pineapple crop of as much as two months and a strengthening of the peduncle.

The term "plant hormone" has been applied to a recognized class of chemical compounds, including phenyl, naphthyl and indole acetic, propionic and butyric acids and their derivatives such as the lower alkyl esters and alkali metal and ammonium salts, and also certain phenoxy and xylenoxy compounds. As examples there may be mentioned alpha naphthalene acetic, beta naphthoxy acetic, indole acetic and indole butyric acids, and amides and alkali metal salts thereof.

I have found that application of such hormones to pineapple plants and fruit as herein described will bring about an increase in the weight and size of the fruit. In some cases, however, this desirable result is accompanied by decrease in the sugar content and adverse effect upon the color of the treated fruit. This undesirable effect may be avoided by treating the plants and fruits, not with a single hormone, but with a mixture comprising at least one hormone selected from the group consisting of alpha naphthalene acetic acid, potassium naphthalene acetate and alpha naphthylacetamide, in combination with one or more hormones selected from the group consisting of beta naphthoxy acetic acid and its ammonium and alkali metal salts.

In establishing the foregoing, numerous tests have been conducted on many plants and in different fields, the effects being checked by comparison with untreated plants in the same locality.

In an illustrative set of these tests, which will serve to illustrate the process as applied to the improvement of the fruit and peduncle, the plants treated had in all cases differentiated and were in various stages of development between differentiation and maturity of the fruit. As is well known, differentiation is the change of the plant from vegetative to flowering condition. The plant hormones employed were alpha naphthalene acetic acid, potassium naphthalene acetate and alpha naphthylacetamide alone and also in combination with beta naphthoxy acetic acid or its alkali metal salts. The hormone was mixed in a liquid carrier consisting of water or of water and lanolin emulsion or of water and alcohol, which was sprayed or poured over the hearts and leaves of the plants in approximately the quantity of 10 cc. to 100 cc. of mix to each plant. The concentrations of mix used were, in proportions of parts of hormone to parts of carrier, 1:500, 1:1,000, 1:5,000, 1:10,000, 1:20,000, 1:33,500. Where mixtures of the acids or alkali metal salts of alpha naphthalene acetic acid, with beta naphthoxy acetic acid, were used, their total concentration ranged from .01% to .04% in the liquid carrier. A representative mix contained beta naphthoxy acetic acid .017% plus alpha naphthalene acetic acid .003% in water or other suitable liquid carrier. Another mixture contained alpha naphthalene acetic acid .01% and beta naphthoxy acetic acid .01%. Many other hormones and combinations of hormones have been used.

Some or all of the following effects were produced:

1. Maturation and ripening of the fruit were delayed, from one week to two months, generally from two to three weeks.

2. The weight and size of the fruit were increased, the fruit of the treated plants being frequently more than a pound heavier than the fruit of the comparative untreated plants.

3. The quality of the fruit was improved.

4. The fruit of the treated plants had larger, more robust eyes than fruits of the comparative untreated plants.

5. The peduncles of the treated plants were larger, stronger and more fibrous than those of the comparative untreated plants.

6. Translucency of the fruit was increased significantly.

7. Blemishes on the fruit were reduced.

As previously indicated, increase in the size of the fruit may be accompanied by delay in the maturation thereof. It may, however, be accomplished without appreciable effect on the time of ripening, and conversely, maturation of the fruit may be delayed without material increase in the size of the fruit.

The effects were greatest and approximately the same with hormone concentrations of from 1,000 to 33,500 parts carrier to one part of hormone applied at any stage of plant development between differentiation and half-grown of the fruit, although later applications including full-grown but not ripe fruit had desirable effects if the combinations included beta naphthoxy acetic acid. Excellent results have been obtained by applying beta naphthoxy acetic acid four to six weeks prior to ripening of the fruit.

For delaying the ripening of fruits developed on plants treated after differentiation, resulting in a delay in rate of maturation and consequent delay in the date of harvest, a preferred mixture contains alpha naphthalene acetic acid or one of its alkali metal salts, and beta naphthoxy acetic acid or one of its alkali metal salts. Either alpha naphthalene acetic acid or beta naphthoxy acetic acid may also be used alone for this purpose. These hormones may be dissolved in water or in a liquid carrier which may suitably be a water and lanolin or water and oil emulsion or a solvent such as alcohol or the like mixed with water.

An aqueous solution of 0.001% 2,4,5-trichlorophenoxy acetic acid applied on the amount of 75 cc. per plant delayed fruiting and increased the size of the fruit. An aqueous solution of 0.02% beta naphthoxy acetic acid retarded ripening and increased the size of the fruit without impairing its quality.

An aqueous solution of 0.02% 2-monochlorophenoxy acetic acid mixed with 0.02% 2,4,6-trichlorophenoxy acetic acid delayed fruit ripening and also aided the absorption of nutrients when applied to plants of high carbohydrate status.

Tests have shown that the effectiveness of a dry dusting powder mix for purposes of the present invention is less, in fact only about one-tenth that of the liquid mix at the same concentrations, so that if such a mix is employed, it should have a higher concentration, for example, about ten times the proportion of hormone to carrier of the liquid mixture.

Successive applications at spaced intervals sufficiently long to insure complete absorption by the plant of the hormone from the previous application, such as the intervals of last flower, one-quarter grown fruit, one-half grown fruit, etc., produced the same effects but to an enhanced degree as compared with the single application of corresponding hormone concentration. Successive applications at spaced intervals of only a few days produced the same effects but to an enhanced degree. Applications should be particularly directed onto the forming fruit, but applications made to lower leaf axils also give delays in ripening and gains in fruit weight.

Within the concentration ranges mentioned, the higher concentrations produced more extensive changes than the weaker concentrations, though repeated applications of a weaker concentration may be employed to produce the same result as a single application in greater concentration.

The hormone treatments may be applied to pineapple plants after the first crop, that is, in the ratoon crop state, as well as to the first crop, with like benefits. The fruit bearing suckers of plants in the ratoon stage generally developed unequally, some being much further matured than others at any given time. Such plants may be treated with hormone, in concentrations previously mentioned as suitable for post-differentiation treatment to increase crop size, at a time when some of the suckers have passed the differentiation stage and others have not. This treatment will produce different effects on individual suckers according to their stage of development, delaying maturation and improving the crop of the suckers which have passed differentiation and, as these concentrations are within the range of concentrations suitable for producing precocious differentiation, accelerating differentiation of the other suckers.

In the practice of the invention, I prefer to apply the hormone in a liquid carrier which may suitably be water or a water and lanolin or a water and oil emulsion, or a solvent such as alcohol or the like mixed with water. If a dry powder is used as a carrier, talc, clay, bentonite, kaolin and the like are suitable. The mixture is sprayed or poured or dusted on the plants. Care is preferably taken to insure direction of a substantial quantity into the hearts of the plants, although this is not absolutely essential. A single hormone may be used, or several may be used in combination.

Having now described and explained preferred practices of the invention, what I desire to claim and secure by Letters Patent is:

1. A method for treating pineapple plants which comprises treating the plants after differentiation and prior to maturity of the fruit with a mixture of a plant hormone and a liquid carrier medium therefor, the hormone concentration of said mixture being one part of hormone to from 1,000 to 33,500 parts of liquid medium, said hormone being selected from the group consisting of the ammonium salts of alpha naphthalene acetic, beta naphthoxy acetic, indole acetic and indole butyric acids.

2. A method for treating pineapple plants which comprises treating the plants after differentiation and prior to maturity of the fruit with a mixture of a plant hormone and a powdered carrier medium therefor, the hormone concentration being one part of hormone to from 100 to 3,600 parts of powdered medium, said hormone being selected from the group consisting of the ammonium salts of alpha naphthalene acetic, beta naphthoxy acetic, indole acetic and indole butyric acids.

3. The treatment of pineapple plants which comprises applying to the plants, after differentiation and prior to full maturity of the fruit, a liquid containing a mixture of a hormone selected from the group consisting of alpha naphthalene acetic acid, potassium naphthalene acetate and alpha naphthylacetamide, with a hormone selected from the group consisting of beta naphthoxy acetic acid and its ammonium and alkali metal salts, the hormone concentration of said mixture being one part hormone to from 1,000 to 33,500 parts of liquid medium.

4. The treatment of pineapple plants which comprises applying to the plants, after differentiation and prior to full maturity of the fruit, a finely-divided carrier medium containing a mixture of a plant hormone selected from the group consisting of alpha naphthalene acetic acid, potassium naphthalene acetate and alpha naphthylacetamide, with a hormone selected from the group consisting of beta naphthoxy acetic acid and its ammonium and alkali metal salts, the hormone concentration of said mixture being one part hormone to 100 to 3600 parts of said finely-divided carrier medium.

5. The treatment of pineapple plants which comprises applying to the plants, after differentiation and prior to full maturity of the fruits, a mixture of a hormone selected from the group consisting of alpha naphthalene acetic acid and its ammonium and alkali metal salts, with a hormone selected from the group consisting of beta naphthoxy acetic acid and its ammonium and alkali metal salts.

6. The treatment of pineapple plants which comprises applying to the plants, after differentiation and prior to full maturity of the fruits, a mixture comprising an alkali metal salt of alpha naphthalene acetic acid and an alkali metal salt of beta naphthoxy acetic acid.

7. A method for the culture of pineapple plants which comprises applying to leaves and lower leaf axils of the plant, after differentiation and prior to full maturity of the fruit, a plant hormone in sufficient quantity to cause an increase in the size of the fruit.

8. A method for the culture of pineapple plants which comprises applying to leaves and lower leaf axils of the plant, after differentiation and prior to full maturity of the fruit, a plant hormone in sufficient quantity to cause a delay in the maturation of the fruit.

FERDINAND P. MEHRLICH.

REFERENCES CITED

The following references are of record in the file of this patent:

UNITED STATES PATENTS

| Number | Name | Date |
| --- | --- | --- |
| 2,220,505 | Avery | Nov. 5, 1940 |
| 2,248,400 | Avery | July 8, 1941 |
| 2,341,867 | Hitchcock | Feb. 15, 1944 |
| 2,428,335 | Mehrlich | Sept. 30, 1947 |

OTHER REFERENCES

Contrib. Boyce Thompson Inst., vol. 8, No. 5, p. 337 (Apr. 27, 1937), by Zimmerman.

Contrib. Boyce Thompson Inst., vol. 11, No. 2, pp. 143–160 (1940), by Hitchcock.

Contrib. Boyce Thompson Inst., vol. 12, pp. 10 and 11 (March 18, 1941), by Zimmerman.